United States Patent

[11] 3,604,312

| [72] | Inventors | John R. Plate<br>Milwaukee, Wis.;<br>James R. Mc Burnett, Stillwater, Okla. |
|---|---|---|
| [21] | Appl. No. | 868,730 |
| [22] | Filed | Oct. 23, 1969 |
| [45] | Patented | Sept. 14, 1971 |
| [73] | Assignee | Allis Chalmers Manufacturing Co.<br>Milwaukee, Wis. |

[54] DRAFT CONTROL VALVE
10 Claims, 4 Drawing Figs.

| [52] | U.S. Cl. | 91/433,<br>137/102, 137/116.3, 91/443, 91/447 |
|---|---|---|
| [51] | Int. Cl. | F15b 11/08 |
| [50] | Field of Search | 137/102,<br>106, 115, 85, 116.3; 91/433, 447, 443 |

[56] References Cited
UNITED STATES PATENTS

| 1,718,673 | 6/1929 | Wettstein | 91/433 X |
| 2,603,235 | 7/1952 | Kirkham | 91/443 X |
| 2,644,429 | 7/1953 | Waterman et al. | 91/443 |

*Primary Examiner*—Robert G. Nilson
*Attorneys*—Arthur L. Nelson, Kenneth C. McKivett and Robert B. Benson ABSTRACT: A draft control valve having metering grooves on the control spool to control the flow rate to the fluid actuator and a flow control valve transmitting return fluid flow from the fluid actuator through the control valve to the reservoir at a rate of flow independent of actuator operating pressure.

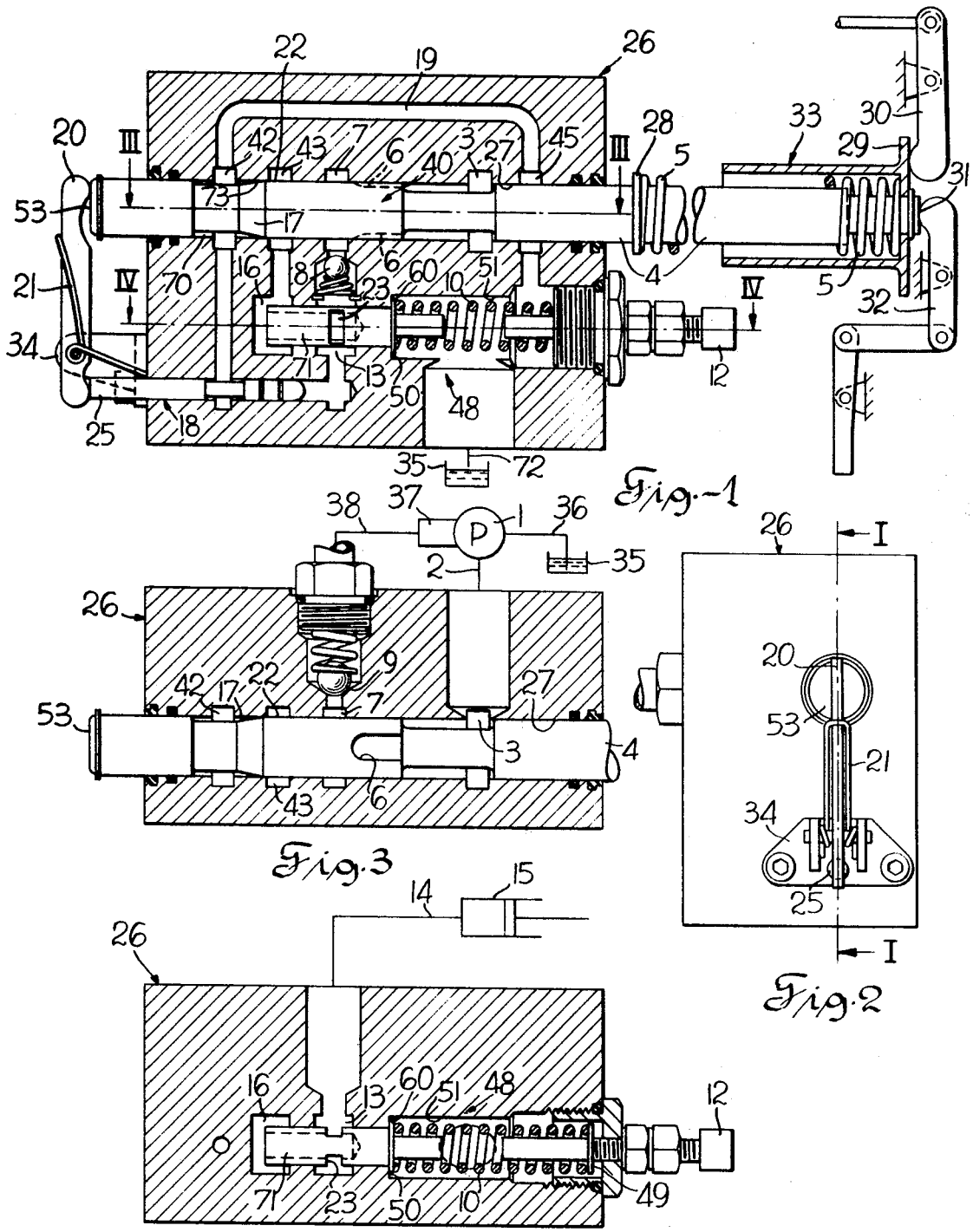

DRAFT CONTROL VALVE

This invention relates to a hydraulic system and more particularly to a hydraulic draft control valve having metering grooves for controlling the flow to the hydraulic fluid actuator and to regulate the return flow from the actuator to the reservoir to maintain a rate of flow independent of actuator pressure.

The modern tractor uses various type of hydraulic equipment to operate auxiliary function. Whether the implement is a fully mounted, a semimounted, or a trail-behind-type implement the basic requirements of the hydraulic systems are generally the same. With the trail-behind implement a sudden increase in load pressure can result due to a change in the ground geometry. With the trail-behind implement, a sensing means will sense an increase in draft load which produces a force signal transmitted to the control valve which controls the pressure in the system and redistribute the weight of the vehicle and the implement. The result will be an increase in the weight on the rear wheels of the tractor which accordingly will increase the traction of the tractor to accommodate the requirement of an increased draft load of the implement.

The action of the trail-behind implement with a draw bar hitch arrangement does not necessarily lift the implement but increases the hydraulic pressure in the system. Under these conditions the draft control valve will function as a pressure control valve by virtue of the pressure feedback spool and lever arrangement. The system pressure will increase with an increase in draft load for the purpose of increasing weight transfer and thereby improving the traction.

The pressure feedback spool and lever arrangement of this invention allows pressure control without oil flow if the load cannot be physically moved. Load pressure will still be proportional to the draft load. With this type of hydraulic system during transport of the trail-behind implement the draft load will be at a minimum. The operator may also use the position control lever to either increases the lift cylinder pressure for the desired purpose of increasing the traction for increasing tractive effort or for so-called dynamic braking.

When it is desired that a semimounted or fully mounted implement be lifted from the field operating position the valve can be operated to provide flow of pressurized fluid to operate a hydraulic actuator which in turn through the linkage will lift the implement to a transport position. The transport position is then maintained until such time as which the implement will then be lowered to the field-operating position.

Accordingly this valve is intended to operate with the fully mounted, or semimounted type of implement. The control valve provides a means to manually operate the valve to provide fluid flow for lift or lower of implement. In the lift operation the flow of pressurized fluid will flow in response to the degree of opening of the metering orifices on the control valve. The pressurized fluid flows from the pump through valve to the hydraulic actuator, When the hydraulic actuator has reached the end of its cycle the valve will then be effectively closed through a feedback arrangement which moves the control valve toward a neutral position.

When it is desired to lower the implement the control valve is moved in the reverse direction to open a variable area orifice defined by the control valve. A flow control valve 48 is also positioned in the circuit intermediate, the hydraulic actuator and the fluid reservoir. When the control valve 40 opens the variable orifice the fluid flows from the actuator through the flow control valve 48 which has a second orifice 23 which opens in response to slight changes of pressure in the constant pressure chamber 16. The flow of pressurized fluid from the actuator 15 returns to the reservoir through the flow control valve and the variable orifice in the control valve. The flow control valve maintains a predetermined rate of lowering, the rate which is dependent upon the opening of the variable area orifice defined by the control valve and the spring 10 setting.

It is an object of this invention to provide a draft control valve with a predetermined rate of flow for lowering the load.

It is another object of this invention to provide a draft control valve with pressure feedback working in opposition to the force signal actuating the control valve.

It is another object of this invention to provide a draft control valve with a pressure-controlled variable orifice and a flow control valve for the return of flow from the hydraulic actuator to the reservoir with a predetermined rate of flow.

The objects of this invention are accomplished by providing a control valve in a closed-center load-responsive system with a variable displacement pump. The draft control valve has metering grooves on the control valve spool to control the rate of flow from the pump to the hydraulic fluid actuator. The operation of the control valve may be manual or it may be automatic in response to a draft or position signal operating the spool.

The return flow from the actuator to the reservoir is controlled by the control valve in conjunction with a flow control valve. A flow control valve includes a constant-pressure chamber operating against the spring biasing the sleeve to produce a variable area orifice for the return flow from the hydraulic actuator. The tapered portion 17 of the control spool 4 defines a variable orifice connected to the constant pressure chamber which varies the cross-sectional area of the orifice which in turn transmits hydraulic fluid from the constant-pressure chamber 16.

The rate of flow for a predetermined orifice area defined by the control valve is constant and the pressure in the constant-pressure chamber remains at the predetermined spring setting of the flow control valve. The control valve spool 4 however may be moved to a position to increase the cross-sectional area of the orifice defined by the tapered portion 17 of the control valve spool and shoulder 73 which in turn will limit the rate of flow to a predetermined valve and so long as the setting for the control valve is maintained the rate of flow will be limited and the maximum rate of lowering of the load will not be exceeded regardless of load on the actuator.

The control valve also includes a pressure-feedback linkage to reposition the control valve spool against the spring biasing actuating force. It is understood that this is true so long as the actuating force or the draft signal is transmitted through the resilient means engaging the offset flange of the control spool. The feedback linkage will close the control valve and reposition the valve to provide a pressure in the system as desired. If an increased pressure in the system is required an increased actuating force will be applied to the control valve spool and an increase in pressure of the system will be provided.

The preferred embodiment of this invention will be illustrated in the attached drawings.

FIG. 1 illustrates a cross section view of the control valve taken on line I—I of FIG. 2.

FIG. 2 is an end view of the control valve;

FIG. 3 is a cross section view taken on line III—III as shown in FIG. 1; and

FIG. 4 is a cross section view along line IV—IV of FIG. 1.

Referring to the drawings FIG. 1 illustrates a cross section view of the control valve showing the flow control valve and the feedback arrangement. A housing 26 defines a cylindrical opening 27 for receiving the spool 4. The spool 4 reciprocates within the opening in response to the actuating forces of the draft or position signal of the automatic control lever 30 or the manual control lever 32. The manual control lever 32 operates directly on the surface 31 on the end of the spool 4 while the automatic control lever 30 operates on the radial flange 29 of the sleeve 33. The sleeve 33 retains the spring 5 which seats on the inner portion of the radial flange 29. The spring also seats on a snapring 28 on the spool 4. The spool 4 also forms an end facing 53 which the feedback lever 20 engages. The feedback lever 20 is pivoted on the bracket 34 on housing 26 and has a portion extending to engage the shank 25 of piston 18. The pressurized fluid in chamber 13 controls the movement of the feedback piston 18 which transmits a feedback force through the shank 25 to the lever 20 to the left end of spool 4. The feedback force repositions the spool 4 when the automatic lever 30 is operating on the sleeve 33. The spool is repositioned in response to an actuating force transmitted through the spring 5.

The pump 1 receives pressurized fluid from the sump 35 through the conduit 36. The conduit 2 supplies pressurized fluid to the chamber 3. The pump 1 has a compensator 37 connected to pilot line 38 to the pilot chamber 7. The pump is a variable displacement pump with a compensator to regulate the volume of displacement during operation. The pressure in the pilot line is sensed by the compensator and controls the stroke of the pump.

The pump supplies pressurized fluid to the chamber 3 which is not in communication with the chamber 7 when the spool 4 of control valve 40 is in the neutral position. The grooves 6 provide communication between the chamber 3 and chamber 7 when the valve is moved in the left-hand direction. When pressurized fluid enters the chamber 7 it flow through chamber 13 to conduit 14 to the actuator 15. The load on the actuator 15 produces a back pressure in the chamber 13. The pressure in chamber 7 opens the check valve 9 and produces a pilot signal in the pilot line 38 which is fed back through the compensator 37 which in turn strokes or destrokes the pump. The pressure on the discharge side of the pump 1 is normally approximately 250 p.s.i. over the load pressure or the pilot pressure.

The manual lever 32 operates directly against the face 31 on the right end of the spool 4 which biases the spool 4 in the left-hand direction to position the spool to provide the desired rate of flow through the groove 6 to chambers 7 and 13 to operate the hydraulic actuator 15. The automatic lever 30 may be adapted to receive a force signal from a draft load which in turn will operate the lever 30 to move the sleeve 33 against the spring 5 and thereby transmit the force signal to the spool 4. When the automatic lever 30 is operated, a feedback force from the pressure in chamber 13 operates the piston 18.

The force is transmitted through lever 20 to the left-hand end of spool 4 to reposition the spool 4 in response to the opposing forces of the actuating spring 5. The signal transmitted through the automatic lever 30 is a position signal which positions the sleeve 33 in response to the signal from the draft load. The chamber 42 is in communication with the sump chamber 19 while the chamber 43 is in communication with the constant-pressure chamber 16. The sump passage 19 is in communication with the chambers 42 and 45 and merely provide communication with the sump 35.

The spool 4 operates in response to the actuating force. When either lever 30 or 32 is retracted the spool will move in the right-hand direction permitting the pressurized fluid in the actuator 15 to return through the flow control valve 48. The flow control valve includes an adjusting screw 12 carrying a spring retainer 49 which biases the spring 10 against the radial flange 60 within the chamber 51. The flange 60 of the sleeve 71 is biased against radial facing 50 to position the valve with the opening 23 in the chamber 13. When the spool 4 is moved in the right-hand direction the tapered portion 17 of the spool 4 permits an opening between the chamber 42 and the constnat-pressure chamber 16. The pressurized fluid from the actuator flows through the chamber 13 through the port 23 into the constant-pressure chamber 16 and through the variable opening defined by the tapered portion 17 on the spool 4. This in turn permits the flow of pressurized fluid into the sump chamber 19 and permits a lowering of the load supported by the actuator 15. The flow control valve 48 provides a uniform rate of lowering of the load. The rate of lowering is dependent only upon the opening defined by the tapered portion 17 on the spool 4 and shoulder 73 of housing 26 and the spring 10 setting when the spool 4 is moved in the right-hand direction.

The operation of this device will be described in following paragraphs.

The valve is adapted for use with a variable displacement pump having a load-sensitive compensator 37. The pump discharge is in communication with a conduit 2 and chamber 3. In the position shown in FIG. 1 the pump flow is blocked and the pilot pressure is at zero pressure. The pump pressure at chamber 3 will be standby pressure of approximately 250 p.s.i. The load pressure is trapped by the check valve 8, spool land 22 and the feedback piston 18. A right-hand force is exerted on spool 4 by the load pressure in chamber 13 pressing on the piston 18 and transmitted through the lever 20. A spring 21 also exerts a constant low-level force on the spool 4 for purposes which will be more fully described. The previously mentioned net right-hand force on the spool 4 must be counteracted by the load spring 5 when the draft signal is applied automatically. The load on spring 5 is of course determined by the magnitude of the draft signal. The appropriate position signal may be applied manually through lever 32 to spool 4. The magnitude of the hydraulic load at this time may be any value lower than some desired maximum of 2,300 p.s.i. for example. Whatever the magnitude of the load the spring 5 must be sufficient to balance the net rightward force. It is easily seen that the rightward force on the spool 4 is directly proportional to the hydraulic load. The purpose of the mechanical lever 20 is to reduce the force level due to maximum load pressure to a reasonable value.

When an operator's signal is applied automatically through the lever 30 this force is transmitted through the spring 5 with a force causing a net leftward force on spool 4. The spool 4 is therefore displaced to the left. Metering grooves 6 now come into communication with the chamber 7. Pump pressure in chamber 3 is now admitted to chamber 7 through the ball check 9, and hence to pump compensator 37 through the pilot line 38. The pump will try to maintain a discharge pressure equal to approximately 250 p.s.i above the pilot line pressure. Pump pressure will therefore continue to increase and will increase to such a level that the load-value check 8 is forced off its seat. Oil will now flow through the metering groove 6, and through the chamber 7 to the chamber 13 communicating in line 14 to the hydraulic actuator 15. The pressure differential across from metering groove 6 will be maintained at 250 p.s.i. on the pump 1. Pump discharge pressure will therefore be equal to the load pressure plus 250 p.s.i. and pump flow rate is determined by the effective area of the grooves 6. As the lift arms raise, the typical linkage feedback relaxes the spring force 5 until an equilibrium position is once again attained.

An increase in draft load above a desired setting will increase the spring load 5 with results similar to those previously described for position signal. An alternative action results if a trail behind implement is used with a traction increasing drawbar hitch arrangement. Basically a traction increasing drawbar system does not allow the liftarm movement due to an increase in hydraulic pressure. Under these conditions the draft control valve will function as a pressure control valve by virtue of the pressure feedback spool-and-lever arrangement. It is desired to increase pressure with increased draft load for the purpose of increasing weight transfer and therefore improving the traction. The pressure feedback spool-and-lever arrangement allows pressure control without fluid flow. That is, if the load cannot physically be moved the load pressure will still be proportional to the draft load. It is also a feature of this invention that during the transport of a trail-behind-type implement, the draft load will be zero. The operator may use the position control lever to increase the lift cylinder pressure for either increasing traction effort or for the so-called dynamic braking.

For considering the lowering of the implement, the fully mounted and semimounted load arrangement will be considered, A decrease in the draft load or a lowering position signal results in a decrease in the spring load 5 from the equilibrium position. If the spring load 5 is decreased the net force due to feedback spool 18 and helper spring 21 will result in a rightward shift of the spool 4 within its bore. Spool groove 70 will then be in communication with the pressure chamber 16. Check valve 8 will then remain on its seat. Note that the pressure level in the chamber 16 is controlled for the purpose of illustration to a desired maximum of approximately 100 p.s.i. by the flow control sleeve 71 and spring load 10. The pressure of 100 p.s.i. is therefore independent of the load pressure. When the spool groove 70 communicates between chamber 16 and passage 19, fluid will be exhausted through the groove 70 to the sump passage 19. This will tend to decrease the pressure in chamber 16 below the desired 100 p.s.i. The sleeve at pressure reducing valve 48 will then be eased leftward to position cross port 23 in communication with the load chamber 13 allowing fluid flow from the load to replenish that fluid exhausted through the groove 70. Therefore, oil from the load is exhausted from the cylinder 15 through the fluid conductor 14 chamber 13 cross port 23, flow control valve sleeve 71, chamber 16, spool groove 70, sump passage 19, fluid conductor 72 to sump 35. It is easily seen that the lowering flow rate is determined by the effective barrier of groove 70 formed by taper 17 of spool 4 and shoulder 73 of housing 26 and the pressure in chamber 16. For a given area of orifice defined by groove 70 the lowered flow rate can be increased or decreased by adjusting the spring force 10 by the adjusting screw 12.

The basic action is similar whether the implement is fully mounted semimounted or trail-behind-type implement. Any increase in load pressure is transmitted to the spool 4 by the feedback spool 18 lever 20, resulting in an increase of pressure by the method previously described.

The preferred embodiments of this invention have been illustrated and described.

The embodiments of the invention in which an exclusive property or privilege is claimed are defined as follows:

1. A draft control valve comprising, a housing defining a spool opening, a spool mounted for reciprocal movement in said opening, means defining an inlet passage adapted for connection to a pump, a sump passage adapted for connection to a sump, and an actuator passage adapted for connection to a hydraulic fluid actuator, a flow control valve operating in said actuator passage of said housing and defining a constant-pressure chamber, means defining feedback means having a piston-sensing pressure in said actuator passage and feeding back a pressure signal to said spool in opposition to a valve actuating force on said spool, said spool defining a metering orifice for selectively and alternatively providing communication between said inlet passage and said actuator passage in response to movement of said spool in a first direction, said spool defining a variable orifice with said housing for selectively connecting said constant-pressure chamber and said flow control valve with the sump passage in response to movement of said spool in a second direction, said spool thereby providing through selective positioning metered flow from the inlet passage to the actuator passage to operate the hydraulic actuator and permitting the flow of pressurized fluid from said hydraulic actuator through said flow control valve and said variable orifice defined by said spool in said housing to provide a predetermined rate of flow of pressurized fluid from said hydraulic actuator to said sump.

2. A draft control valve as set forth in claim 1 wherein said feedback means includes a lever and a mechanism for sensing the pressurized fluid in said actuator passage for feeding back a proportional force to said spool in opposition to the actuating force on said spool.

3. A draft control valve as set forth in claim 1 wherein said flow control valve includes a sleeve defining an orifice, means biasing said sleeve to open said orifice to the maximum opening whereby pressurized fluid in said constant-pressure chamber biases said sleeve in opposition to said biasing means to close said port and thereby control the flow of pressurized fluid from said actuator passage to said constant-pressure chamber in response to opening of said variable orifice defined by said spool and housing to control the flow through said flow control valve to a predetermined rate.

4. A draft valve as set forth in claim 1 wherein said flow control valve includes a sleeve having a port, resilient means biasing said sleeve to a position of maximum opening of said port, said resilient means biasing said sleeve includes a spring positioned for engaging an adjustable screw to provide a variable force transmitted from said spring to vary the rate of flow of said flow control valve when said valve is in operation.

5. A draft control valve as set forth in claim 1 wherein said housing defines a pilot passage having a check valve permitting the flow of pressurized fluid flowing through said metering orifice and check valve to transmit a pilot signal adapted for controlling the volume of displacement of a variable displacement pump.

6. A draft control valve as set forth in claim 1 having an actuating means including a manual means directly engaging said spool to selectively position said spool for controlling the flow of pressurized fluid through said draft control valve, an automatic means connected through a resilient means for transmitting a draft signal to said spool to selectively position said spool.

7. A draft control valve as set forth in claim 1 wherein said spool defines a tapered portion forming annular recess on the external periphery of said spool, a shoulder defined by said valve housing to define a variable-area orifice variable in response to positioning of said spool relative to said housing to thereby control the flow rate of discharge from said hydraulic fluid actuator to said sump.

8. A draft control valve as set forth in claim 1 wherein said housing defines a chamber encircling said spool selectively in communication with said metering orifice and in communication with said actuator passage including a check valve to permit the flow of pressurized fluid from said metering orifice to said hydraulic fluid actuator and block return flow to said chamber and thereby providing a holding means for said hydraulic actuator in event of loss of pressure in said inlet passage.

9. A draft control valve as set forth in claim 1 wherein said flow control valve includes a variable orifice defined by a sleeve, including a port communicating with said constant-pressure chamber and said actuator passage, means biasing said sleeve to provide maximum opening of said sleeve port, said sleeve thereby automatically positioning itself in response to the opening of said variable orifice defined by said spool in said housing to control the area of opening of said port on said sleeve to maintain a substantially constant pressure in said constant pressure chamber and control the rate of flow from said fluid actuator to said sump regardless of pressure in said actuator passage.

10. A draft control valve as set forth in claim 1 wherein said spool defines an annular recess in communication with said metering orifice, said housing defines an annular recess around said annular recess in said spool thereby defining a pressure chamber for supplying pressurized fluid to said metering orifice for flow of pressurized fluid to said hydraulic actuator when said draft control valve is operated.